(12) United States Patent
Wang et al.

(10) Patent No.: US 11,901,502 B2
(45) Date of Patent: Feb. 13, 2024

(54) ELECTRODES FOR INCREASED WETTABILITY

(71) Applicant: Apple Inc., Cupertino, CA (US)

(72) Inventors: Dapeng Wang, San Jose, CA (US); Hirotsugu Oba, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/093,235

(22) Filed: Jan. 4, 2023

(65) Prior Publication Data

US 2023/0136634 A1 May 4, 2023

Related U.S. Application Data

(62) Division of application No. 16/580,547, filed on Sep. 24, 2019, now Pat. No. 11,552,327.

(51) Int. Cl.
| | |
|---|---|
| *H01M 10/0525* | (2010.01) |
| *H01M 10/0585* | (2010.01) |
| *H01M 4/70* | (2006.01) |
| *H01M 50/10* | (2021.01) |
| *H01M 50/46* | (2021.01) |

(52) U.S. Cl.
CPC ......... *H01M 10/0525* (2013.01); *H01M 4/70* (2013.01); *H01M 10/0585* (2013.01); *H01M 50/10* (2021.01); *H01M 50/46* (2021.01)

(58) Field of Classification Search
CPC ............... H01M 10/0525; H01M 4/70; H01M 10/0585; H01M 50/10; H01M 50/46; H01M 2004/025; H01M 4/13; H01M 2004/021; Y02E 60/10; Y02P 70/50
USPC .......................................... 429/209
See application file for complete search history.

(56) References Cited

U.S. PATENT DOCUMENTS

2011/0281152 A1    11/2011   He et al.
2018/0145373 A1*   5/2018   Han .................. H01M 4/70

OTHER PUBLICATIONS

"Non-Final Office Action," dated Mar. 15, 2022 in U.S. Appl. No. 16/580,547. 7 pages. (copy not included).
"Notice of Allowance," dated Sep. 16, 2022 in U.S. Appl. No. 16/580,547. 7 pages. (copy not included).

* cited by examiner

*Primary Examiner* — Gary D Harris
(74) *Attorney, Agent, or Firm* — Kilpatrick Townsenand Stockton LLP

(57) ABSTRACT

An electrode stack is described. The electrode stack may include an anode electrode having an anode current collector, and an anode active material disposed on the anode current collector. The anode electrode may define one or more first apertures through the anode electrode. The electrode stack may also include a cathode electrode having a cathode current collector, and a cathode active material disposed on the cathode current collector. The cathode electrode may define one or more second apertures through the cathode electrode.

12 Claims, 4 Drawing Sheets

ELECTRODES FOR INCREASED WETTABILITY

CROSS-REFERENCE TO RELATED APPLICATION

This application is a divisional of U.S. patent application Ser. No. 16/580,547 filed Sep. 24, 2019 entitled, "ELECTRODES FOR INCREASED WETTABILITY," which is incorporated herein by reference in its entirety.

TECHNICAL FIELD

The present technology relates to batteries. More specifically, the present technology relates to battery electrodes and component configurations.

BACKGROUND

Batteries are used in many devices. As battery enclosures and electrode configurations are modified for various reasons, the configurations may impact battery cell materials and designs.

SUMMARY

Batteries according to embodiments of the present technology may include an electrode stack. The electrode stack may include an anode electrode having an anode current collector, and an anode active material disposed on the anode current collector. The anode electrode may define one or more first apertures through the anode electrode. The electrode stack may also include a cathode electrode having a cathode current collector, and a cathode active material disposed on the cathode current collector. The cathode electrode may define one or more second apertures through the cathode electrode.

In some embodiments, each first aperture of the one or more first apertures may be axially aligned with a second aperture of the one or more second apertures. Each first aperture of the one or more first apertures may be characterized by a first diameter, and each second aperture of the one or more second apertures may be characterized by a second diameter. The second diameter may be greater than the first diameter. The stacks may include a separator positioned between the anode electrode and the cathode electrode. The separator may form a physical barrier between each first aperture of the first apertures and each second aperture of the second apertures. The anode electrode and the cathode electrode may each be characterized by a longitudinal body section and a lateral body section extending from and normal to the longitudinal body section. An intersection of the longitudinal body section and the lateral body section may define an interior corner. The anode electrode and the cathode electrode may each define the interior corner as an arcuate shape recessed from a planar intersection of a sidewall of the lateral body section and a sidewall of the longitudinal body section. The one or more first apertures may include a plurality of first apertures. A subset of the plurality of first apertures may be distributed parallel to a centerline through the longitudinal body section of the anode electrode. A subset of the plurality of first apertures may be distributed parallel to a centerline through the lateral body section of the anode electrode.

Some embodiments of the present technology may encompass batteries. The batteries may include an enclosure. The batteries may include an electrode stack including a separator positioned between an anode and a cathode. The anode may include an anode current collector, and an anode active material disposed on the anode current collector. The anode may define one or more first apertures through the anode. The cathode may include a cathode current collector, and a cathode active material disposed on the cathode current collector. The cathode may define one or more second apertures through the cathode. The batteries may include an electrolyte.

In some embodiments, each first aperture of the one or more first apertures may be axially aligned with a second aperture of the one or more second apertures. Each first aperture of the one or more first apertures may be characterized by a first diameter. Each second aperture of the one or more second apertures may be characterized by a second diameter. The second diameter may be greater than the first diameter. Each first aperture of the one or more first apertures may extend radially inward of an associated second aperture of the one or more second apertures towards a centerline through each associated pair of apertures. The separator may form a continuous physical barrier between each the anode and the cathode. The anode and the cathode may each be characterized by a longitudinal body section and a lateral body section extending from and normal to the longitudinal body section. An intersection of the longitudinal body section and the lateral body section may define an interior corner. The enclosure may include a pouch extending about the electrode stack. The pouch may include a seal extending about a plurality of sides of the battery including at the interior corner.

Some embodiments of the present technology may encompass batteries. The batteries may include a pouch. The batteries may include a battery cell housed within the pouch. The battery cell may include an anode including an anode current collector, and an anode active material disposed on the anode current collector. The anode may define one or more first apertures through the anode. The battery cell may include a cathode including a cathode current collector, and a cathode active material disposed on the cathode current collector. The cathode may define one or more second apertures through the cathode. The battery cell may include a separator disposed between the anode and the cathode. The batteries may include an electrolyte.

In some embodiments, each first aperture of the one or more first apertures may be axially aligned with a second aperture of the one or more second apertures. Each first aperture of the one or more first apertures may be characterized by a first diameter. Each second aperture of the one or more second apertures may be characterized by a second diameter, and the second diameter may be greater than the first diameter. The separator may form a physical barrier between each first aperture of the first apertures and each second aperture of the second apertures.

Such technology may provide numerous benefits over conventional technology. For example, the present batteries may be characterized by improved performance for battery cells. Additionally, the batteries may be characterized by better wetting to produce improved electrolyte distribution within a cell. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Figure 1:
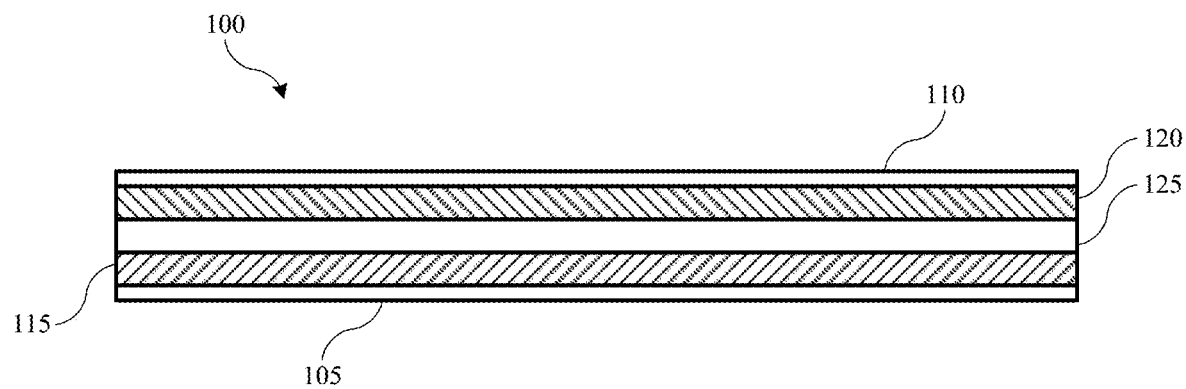
FIG. 1 shows a schematic cross-sectional view of a battery cell according to some embodiments of the present technology.

Several of the figures are included as schematics. It is to be understood that the figures are for illustrative purposes, and are not to be considered of scale or proportion unless specifically stated to be of scale or proportion. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, battery cells, and more generally energy storage devices, are used in a host of different systems. In many devices, the battery cells may be designed with a balance of characteristics in mind. For example, including larger batteries may provide increased usage between charges, however, the larger batteries may require larger housing, or increased space within the device. As device designs and configurations change, especially in efforts to reduce device sizes, the available space for additional battery components may be constrained. These constraints may include restrictions in available volume as well as the geometry of such a volume.

Some battery enclosure materials may afford reduced production tolerances, which may allow an increase in the size of battery cell components within the enclosure. However, reduced space between cell internal components and the enclosure may challenge electrolyte filling operations. In many battery technologies, an electrode stack may be disposed within a housing, such as a rigid enclosure, including conductive enclosures, or a pouch enclosure. Electrolyte may then be delivered, such as through injection, into one or more locations about the housing, and then be absorbed through the electrode materials. Depending on material properties of the electrode active materials, the geometry of the electrodes, and the space through which electrolyte may flow, electrolyte may or may not fully express through the battery cell materials, which may leave dry spots at more centralized or greater diffusion length locations. Techniques for adhering the electrodes to the separator may further block pores within the separator, which may additionally reduce diffusion of electrolyte through the stack.

For example, in many stack cell manufacturing processes, cathode, anode, and separator materials may be stacked sequentially and then compressed to promote dry adhesion between the separator and electrodes. This process may improve flatness of the cell and pack efficiency, which may increase volumetric energy density of a battery incorporating the stack. However, with the applied pressure and/or temperature, in addition to reducing gap distances, pores of the separator may be at least partially blocked, which may reduce or limit electrolyte penetration through the electrode stack, and thus, cell wetting, which may produce dry spots.

When dry spots occur within an electrode, impedance may be higher during charging, and full charging of the formed battery cell may not be possible as lithiation may not occur in certain regions without electrolyte. Additionally, lithium dendrites or plating may occur, cells may swell, and capacity may be degraded, among other issues. The present technology may overcome these issues, however, by providing a configuration by which battery cell components may be configured to improve electrolyte wetting of the internal cell. By incorporating apertures through the electrode, additional diffusion paths may be provided throughout the cell, which may limit any particular length for electrolyte ingression to a particular length from an aperture. This may facilitate complete wetting, as well as reduce the time for wetting an electrode stack with electrolyte. After illustrating an exemplary cell and enclosure that may be used in embodiments of the present technology, the present disclosure will describe battery designs having electrodes defining apertures for use in a variety of devices in which battery cells may be used.

Although the remaining portions of the description will reference lithium-ion batteries, it will be readily understood by the skilled artisan that the technology is not so limited. The present techniques may be employed with any number of battery or energy storage devices, including other rechargeable and primary battery types, as well as secondary batteries, or electrochemical capacitors. Moreover, the present technology may be applicable to batteries and energy storage devices used in any number of technologies that may include, without limitation, phones and mobile devices, watches, glasses, bracelets, anklets, and other wearable technology including fitness devices, handheld electronic devices, laptops and other computers, as well as other devices that may benefit from the use of the variously described battery technology.

FIG. 1 depicts a schematic cross-sectional view of an energy storage device or battery cell 100 according to embodiments of the present technology. Battery cell 100 may be or include a battery cell, and may be one of a number of cells coupled together to form a battery structure. As would be readily understood, the layers are not shown at any particular scale, and are intended merely to show the possible layers of cell material of one or more cells that may be incorporated into an energy storage device. In some embodiments, as shown in FIG. 1, battery cell 100 includes a first current collector 105 and a second current collector 110. In embodiments one or both of the current collectors may include a metal or a non-metal material, such as a polymer or composite that may include a conductive material. The first current collector 105 and second current collector 110 may be different materials in embodiments. For example, in some embodiments the first current collector 105 may be a material selected based on the potential of an anode active material 115, and may be or include copper, stainless steel, or any other suitable metal, as well as a non-metal material including a polymer. The second current collector 110 may be a material selected based on the potential of a cathode active material 120, and may be or include aluminum, stainless steel, or other suitable metals, as well as a non-metal material including a polymer. In other words, the materials for the first and second current collectors can be selected based on electrochemical compatibility with the anode and cathode active materials used, and may be any material known to be compatible.

In some instances the metals or non-metals used in the first and second current collectors may be the same or different. The materials selected for the anode and cathode active materials may be any suitable battery materials operable in rechargeable as well as primary battery designs. For example, the anode active material 115 may be silicon, silicon oxide, silicon alloy, graphite, carbon, a tin alloy, lithium metal, a lithium-containing material, such as lithium titanium oxide (LTO), a combination of any of these materials, or other suitable materials that can form an anode in a battery cell. Additionally, for example, the cathode active material 120 may be a lithium-containing material. In some embodiments, the lithium-containing material may be a lithium metal oxide, such as lithium cobalt oxide, lithium manganese oxide, lithium nickel manganese cobalt oxide, lithium nickel cobalt aluminum oxide, lithium nickel cobalt manganese oxide, lithium nickel cobalt aluminum oxide, lithium titanate, or a combination of any of these materials, while in other embodiments the lithium-containing material can be a lithium iron phosphate, or other suitable materials that can form a cathode in a battery cell.

The first and second current collectors as well as the active materials may have any suitable thickness. A separator 125 may be disposed between the electrodes, and may be a polymer film, a ceramic membrane, or a material that may allow lithium ions to pass through the structure while not otherwise conducting electricity. Active materials 115 and 120 may additionally include an amount of electrolyte in a completed cell configuration, which may be absorbed within the separator 125 as well. The electrolyte may be a liquid including one or more salt compounds that have been dissolved in one or more solvents. The salt compounds may include lithium-containing salt compounds in embodiments, and may include one or more lithium salts including, for example, lithium compounds incorporating one or more halogen elements such as fluorine or chlorine, as well as other non-metal elements such as phosphorus, and semi-metal elements including boron, for example.

In some embodiments, the salts may include any lithium-containing material that may be soluble in organic solvents. The solvents included with the lithium-containing salt may be organic solvents, and may include one or more carbonates. For example, the solvents may include one or more carbonates including propylene carbonate, ethylene carbonate, ethyl methyl carbonate, dimethyl carbonate, diethyl carbonate, and fluoroethylene carbonate. Combinations of solvents may be included, and may include for example, propylene carbonate and ethyl methyl carbonate as an exemplary combination. Any other solvent may be included that may enable dissolving the lithium-containing salt or salts as well as other electrolyte component, for example, or may provide useful ionic conductivities, such as greater than or about 5' mS/cm.

Although illustrated as single layers of electrode material, battery cell 100 may be any number of layers. Although the cell may be composed of one layer each of anode and cathode material as sheets, the layers may also be formed into a jelly roll design, or folded design, prismatic design, or any form such that any number of layers may be included in battery cell 100. For embodiments which include multiple layers, tab portions of each anode current collector may be coupled together, as may be tab portions of each cathode current collector. Once the cell has been formed, a pouch, housing, or enclosure may be formed about the cell to contain electrolyte and other materials within the cell structure, as will be described below. Terminals may extend from or be coupled with the enclosure to allow electrical coupling of the cell for use in devices, including an anode and cathode terminal. The coupling may be directly connected with a load that may utilize the power, and in some embodiments the battery cell may be coupled with a control module that may monitor and control charging and discharging of the battery cell. FIG. 1 is included as an exemplary cell that may be incorporated in batteries according to the present technology. It is to be understood, however, that any number of battery and battery cell designs and materials that may include charging and discharging capabilities similarly may be encompassed by or incorporated with the present technology.

Figure 2:
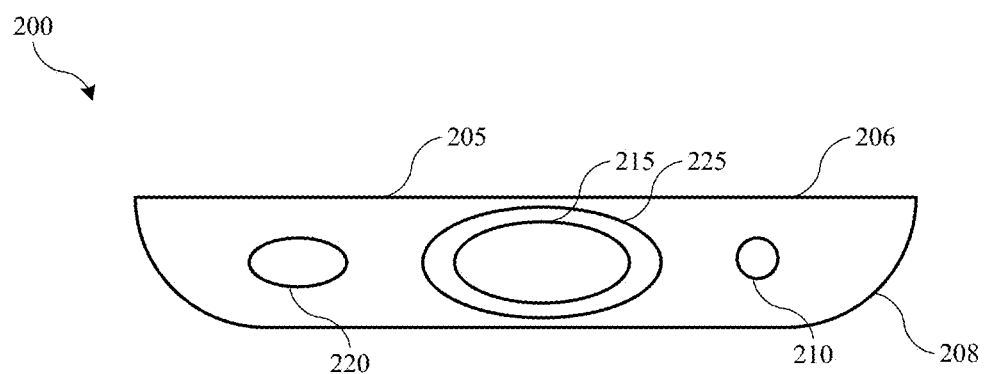
FIG. 2 shows a schematic front elevation view of a battery according to some embodiments of the present technology.

FIG. 2 shows a schematic elevation view of a battery 200 according to some embodiments of the present technology. As illustrated, battery 200 may include a housing or enclosure 205, which may include any number of battery cells, including cells as previously described, incorporated within the enclosure. Enclosure 205 may include a rigid housing, and may include a conductive housing, such as stainless steel, or any other metal or conductive material. The conductive housing may be maintained at positive or negative potential in embodiments, and may be maintained at negative potential, which may then operate as a device ground, and be considered similar to a neutral connection within a device incorporating the battery. Additionally, by using a rigid housing instead of a flexible pouch, fabrication tolerances on the battery dimensions may be reduced, which may afford increased volume for the internal battery cells, which may provide increased capacity over conventional designs. The rigid housing or can may include a lid 206 enclosure for the rest of the housing, which may include a base 208 defining an internal volume in which cell materials are incorporated. The lid 206 and base 208 may include a seamless or substantially seamless form providing an internal volume in which the battery cell or cells and electrolyte may be contained.

Battery 200 may include one or more terminals extending from battery enclosure 205 and providing electrical access to the battery cell. Additionally, a port 210 may be positioned along a surface of the enclosure as illustrated. Port 210 may be a fill port or other access to battery 200, and may be sealed in embodiments. Port 210 may be positioned proximate a lateral edge of battery 200 and may be used as an injection location for electrolyte to fill battery 200 and form a functioning cell.

A first electrode terminal 215 and a second electrode terminal 220 may extend from or be accessible along a surface, such as a front surface of battery enclosure 205. In some embodiments, each of the first electrode terminal and the second electrode terminal may extend from the surface of battery enclosure 205 a similar distance. In some embodiments, first electrode terminal 215 may extend outward from the surface further than second electrode terminal 220. As previously noted, in some embodiments the enclosure 205 of battery 200 may be conductive and may be at the potential of one of the electrodes, such as the anode, although the housing may also be maintained at cathode potential. The second electrode terminal 220 may represent the electrode terminal of the potential at which the housing is maintained. Accordingly, the terminal may be a contact, tab, or access of the housing. The first electrode terminal 215, however, may be at the opposite potential of the housing and/or the second electrode terminal 220, and may be maintained or electrically isolated from the rest of the housing. For example, first electrode terminal 215 may be the cathode terminal, although the terminal may also be maintained at anode potential in other embodiments.

To isolate the first electrode terminal 215 from the rest of the housing, a spacer 225 may extend circumferentially about the first electrode terminal, and extend through the housing of battery enclosure 205. In some embodiments, spacer 225 may fully isolate first electrode terminal 215 from the battery enclosure 205 both internally and externally to avoid a potential short between the housing, which may be at anode potential, and first electrode terminal 215, which may be at cathode potential. Battery 200 illustrates one type of housing or enclosure that may be encompassed by aspects of the present technology, including incorporating electrode stacks as described further below. Additional pouch enclosures may similarly be encompassed by the present technology and are included in aspects described further below.

Figure 3A:
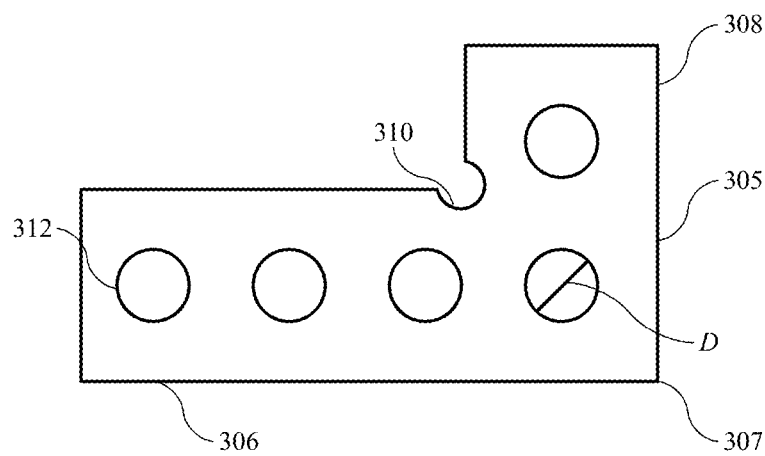
FIGS. 3A-3C show schematic plan views of electrode stack components according to some embodiments of the present technology.
Figure 3B:
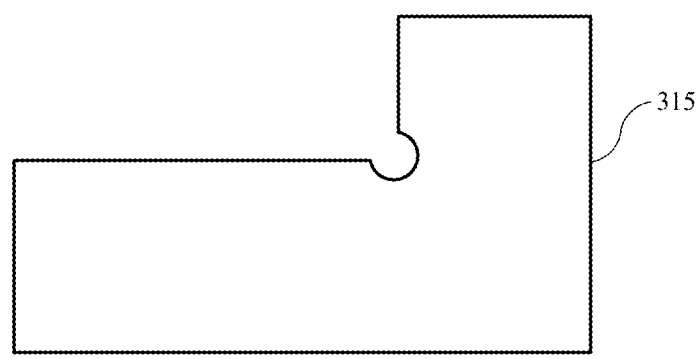
Figure 3C:
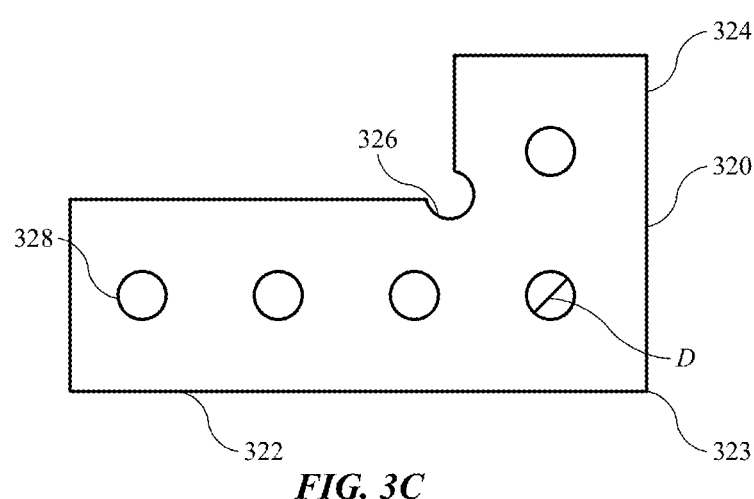

Turning to FIGS. 3A-3C are illustrated schematic plan views of electrode stack components according to some embodiments of the present technology. The components illustrated may be additional views of the electrode stack illustrated in FIG. 1, which may illustrate the components of a battery cell. For example, any one or more of the components illustrated in the figures may be included in battery cell 100 in a variety of combinations. Embodiments of the present technology may also encompass multi-dimensional electrode configurations as illustrated, which may include oblong or non-rectangular shapes, although it is to be understood that the present technology may benefit any electrode design, and may encompass any electrode geometry.

FIG. 3A illustrates a plan view of an exemplary electrode 305, which may operate as a cathode electrode according to some embodiments of the present technology. Electrode 305 may include any of the components described above including a current collector and a cathode active material. Although any number of electrode and battery cell configurations may be used, electrodes and battery cells according to some embodiments of the present technology may be characterized by geometries other than rectangular, which may include an L-shaped configuration as illustrated. In this configuration, the electrode may include a longitudinal body section 306 and a lateral body section 308. Both sections may extend from a corner of the electrode 305, and may extend normal to one another, although any angle of extension may be accommodated, which may be greater than or less than ninety degrees. Longitudinal body section 306 may be characterized by a length in a first direction from an exterior corner 307, and lateral body section 308 may be characterized by a length in a second direction perpendicular to the first direction from exterior corner 307. Although shown as extending to different lengths, it is to be understood that the body sections may extend to a similar length or any different lengths in each direction. Non-rectangular configurations may provide further accommodation for electronic devices, which may incorporate additional components providing other than rectangular volumes for batteries.

Electrode 305 may also define an interior corner 310, which may resemble a joint, such as a recessed corner of the joint, at which the lateral body section and the longitudinal body section intersect. Interior corner 310 may be characterized by any number of shapes, including a straight corner. However, a rigid corner may challenge sealing at the location because the material may not permit folding, and tape or other material may not adequately fold about such a corner. Accordingly, in some embodiments interior corner 310 may be characterized by a different shape. Any number of alternative shapes may be used, including a curved corner as illustrated. For example, the battery cell may define the interior corner as recessed from what would be a rigid corner along the adjacent sidewalls, were a lateral side and longitudinal side extended directly together to produce the interior corner. As illustrated, electrode 305 defines the interior corner as an arcuate shape recessed from the planar intersection along an interior side of longitudinal body section 306 and lateral body section 308. This may facilitate additional operations discussed below.

Electrode 305 may include a current collector and active material disposed on the current collector as previously described, and as will be described further below. Electrode configurations such as illustrated may further challenge electrolyte wetting of the electrode active materials, and thus electrode 305 may also define one or more apertures 312 through the cathode electrode 305. In some embodiments the electrodes may define a plurality of apertures through the electrode, as illustrated. The apertures 312 may be of any number of different sizes, and may or may not be all a similar size as illustrated. Each aperture 312 may be characterized by a diameter D, which may be greater than a diameter of a corresponding anode aperture, when included, as will be described further below. It is to be understood that although circular apertures are illustrated, the present technology may encompass apertures of any number of shapes and dimensions. For example, apertures may be ovular, rectangular, or characterized by any other geometry including a combination of aperture geometries across an electrode. Accordingly, the circular apertures illustrated are not intended to limit the technology. Additionally, the term diameter may be used to define a dimension across any two sections of an aperture regardless of shape, and thus is similarly not to be considered limited to circular apertures.

The apertures may be located at any number of locations across the electrode, and may occur in a number of distributions, including linear as illustrated. Apertures effectively reduce the electrode area, which may affect the volumetric density of the cell formed from such electrodes, however, battery cells with electrodes incorporating apertures can additionally be compressed for thickness reduction, with less concern for further reducing wetting paths. These reductions may not be feasible for conventional electrodes due to further challenges to wetting. Moreover, each aperture may provide an additional electrolyte diffusion path through the electrode, which may increase electrode wetting with electrolyte, and may further compensate for a portion of the reduced area by limiting or preventing dry spots in the battery cell.

The illustrated electrode shows one exemplary aperture distribution encompassed by embodiments of the present technology, which is not intended to be limiting. One or more apertures may be included in either or both of longitudinal body section 306 and/or lateral body section 308. For example, a subset of the one or more of the apertures 312 may be distributed parallel to, including along or at least partially intersecting, a centerline through the longitudinal body section 306 of the electrode. Additionally, a subset of the one or more apertures 312 may be distributed parallel to, including along or at least partially intersecting, a centerline through the lateral body section 308 of the electrode. Accordingly, electrolyte introduced to the electrode may have limited diffusion paths to any center portion or any region of the electrode due to the apertures providing direct access through the electrode and to any internal region of the electrode.

FIG. 3B illustrates a plan view of an exemplary separator 315 that may be included within an electrode stack as previously described, and may be included with electrode 305 in some embodiments. Separator 315 may include a similar geometry as electrode 305, or the cathode, and may include an identical geometry as illustrated, including a longitudinal body section, a lateral body section, and an interior corner as described above. Separator 315 may be larger or smaller in any dimension than electrode 305. Separator 315 may be positioned between an anode electrode and a cathode electrode, such as electrode 305, in some embodiments as described above. Additionally, separator 315 may not include any apertures such as apertures extending through the cathode or anode as described elsewhere. In some embodiments, separator 315 may provide a continuous, physical barrier between the electrodes as well as apertures formed through each of the electrodes. It is to be understood that apertures as described for the electrodes are not to be confused with pores of the separator, which may allow ionic conductivity for operation of the cell. Although the separator 315 may have pores through the structure, apertures may not be defined through the separator 315 like apertures defined though the electrodes, which may also include an amount of porosity, for example, within the electrode active material.

FIG. 3C illustrates a plan view of an exemplary electrode 320, which may operate as an anode electrode, according to some embodiments of the present technology. Electrode 320 may include any of the components described above including a current collector and an anode active material, as well as any of the features, characteristics, or configurations of electrode 305. Electrode 320 may be larger or smaller than electrode 305, or may be characterized by a similar dimension for some portions, or all portions of the electrode. For example, the electrode 320 may include a longitudinal body section 322 and a lateral body section 324, which may intersect at exterior corner 323, similar to as described above, and which may include any of the characteristics of that arrangement or configuration.

Electrode 320 may also define an interior corner 326, which may resemble a joint, such as a recessed corner of the joint, at which the lateral body section and the longitudinal body section intersect. Similarly as described above, in some embodiments interior corner 326 may be characterized by an arcuate shape recessed from the planar intersection along an interior side of longitudinal body section 322 and lateral body section 324, although any other shape may similarly be encompassed by the present technology. This may facilitate additional operations discussed below.

Again to facilitate wetting of the electrode in some embodiments, electrode 320 may also define one or more apertures 328 through the anode electrode 320. In some embodiments the electrode may define a plurality of apertures 328 through the electrode, as illustrated. The apertures 328 may be of any number of different sizes, and may or may not be all a similar size as illustrated. Each aperture 328 may be characterized by a diameter D, which may be less than a diameter of a corresponding cathode aperture, when included, as noted previously. The apertures may also be located at any number of locations across the electrode, and may occur in a number of distributions, including linear as illustrated. Again, without intending to limit the present technology, one or more apertures may be included in either or both of longitudinal body section 322 and/or lateral body section 324. For example, a subset of the one or more of the apertures 328 may be distributed parallel to, including along or at least partially intersecting, a centerline through the longitudinal body section 322 of the electrode. Additionally, a subset of the one or more apertures 328 may be distributed parallel to, including along or at least partially intersecting, a centerline through the lateral body section 324 of the electrode. This may similarly improve electrolyte diffusion through the electrode.

Figure 4A:
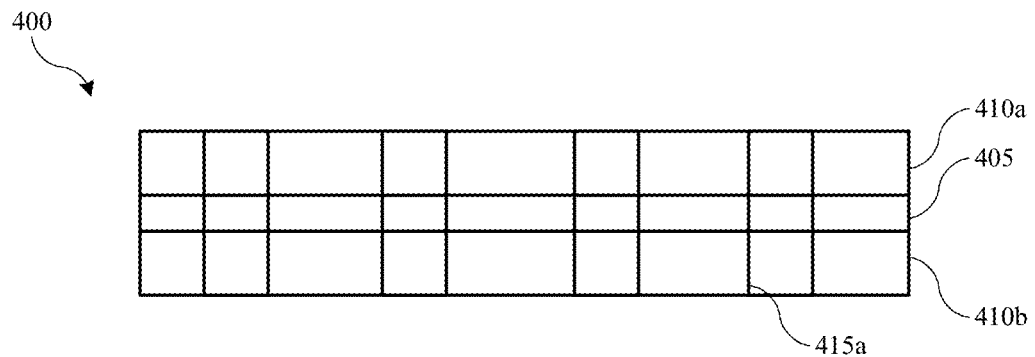
FIGS. 4A-4B show schematic elevation views of exemplary electrodes according to some embodiments of the present technology.
Figure 4B:
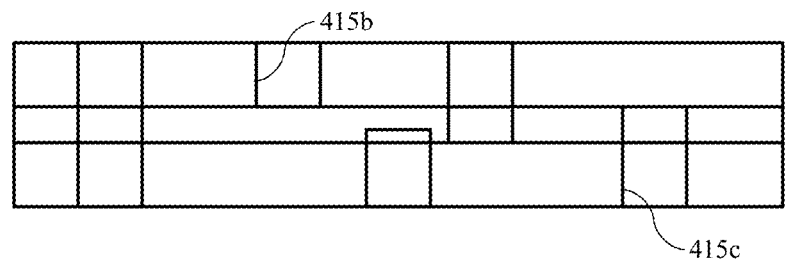

FIGS. 4A-4B show schematic elevation views of an exemplary electrode 400 according to some embodiments of the present technology. Electrode 400 may include any feature, characteristic, or component of any electrode described previously, and may illustrate additional features of electrodes including apertures according to some embodiments. Electrodes according to some embodiments of the present technology may include a current collector 405 as well as an amount of electrode active material 410. Electrode active material 410 may be included on either of a first surface or an opposing second surface of the current collector, such as described above. Additionally, a first electrode active material 410a may be disposed on a first surface of a current collector 405, and a second electrode active material 410b may be disposed on a second surface of a current collector 405 as illustrated. Either a cathode or anode or any electrode of an electrode stack may include electrode active material on one or more surfaces of a current collector.

As described previously, apertures 415 may extend through electrodes according to some embodiments of the present technology. Apertures 415a may extend through each component of electrode 400 as illustrated in FIG. 4A, and may form a complete aperture through the electrode in some embodiments. In some embodiments the apertures may be characterized by additional profiles, such as not fully extending through the electrode, as illustrated for certain apertures in FIG. 4B. For example, in some embodiments apertures 415b may extend through one side of the electrode active material, but may end at or partially through the current collector 405. Additionally, apertures 415c may extend through one side of the electrode active material and the current collector, but may not extend or may not extend fully through the other side electrode active material. Apertures extending partially through the electrode may begin from either side, and may be distributed across each surface of the electrode as well. By producing apertures through the electrodes, electrolyte may easily reach central or other distal regions of the active material to provide more complete wetting of the electrode active materials.

Figure 5:
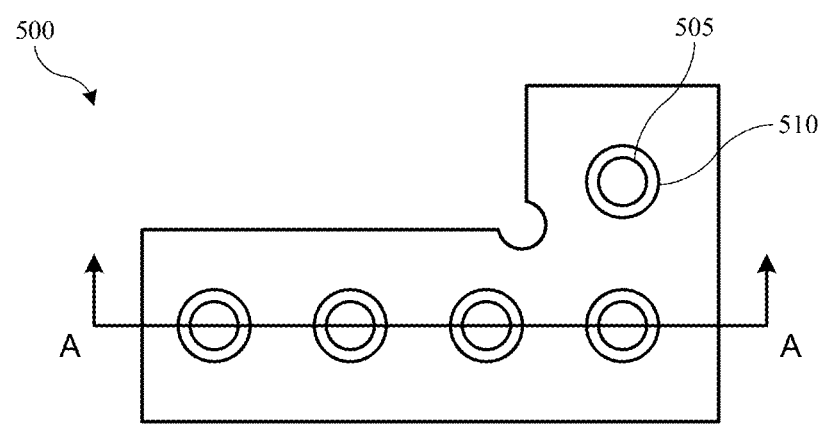
FIG. 5 shows a schematic plan view of an electrode stack according to some embodiments of the present technology.

FIG. 5 shows a schematic plan view of an electrode stack 500 according to some embodiments of the present technology. The figure may include a formed electrode stack, which may include aspects of any component previously described. For example, electrode stack 500 may be included in an enclosure, such as any enclosure for a battery cell, and may include an anode, a cathode, and a separator. The figure may illustrate a phantom separator to illustrate the overhang of anode active material in some embodiments. For example, as previously described, first apertures 505 through anode electrodes may be characterized by a first diameter through the electrode in some embodiments. Additionally, second apertures 510 through the cathode electrodes may be characterized by a second diameter through the electrode. As shown, the diameter of the second apertures, such as through the cathode material, may be greater than the diameter of the first apertures, such as through the anode active material. Each first aperture of the one or more first apertures may extend radially inward of an associated second aperture as illustrated. Although in some embodiments the cathode apertures may be characterized by a smaller diameter than the anode apertures, the anode overhang may occur on all edges produced, including on lateral edges of the electrode active material as well as on interior edges of the apertures as shown. Depending on enclosure configurations or other characteristics, the anode overhang may reduce the potential for short circuiting, for example.

Figure 6:
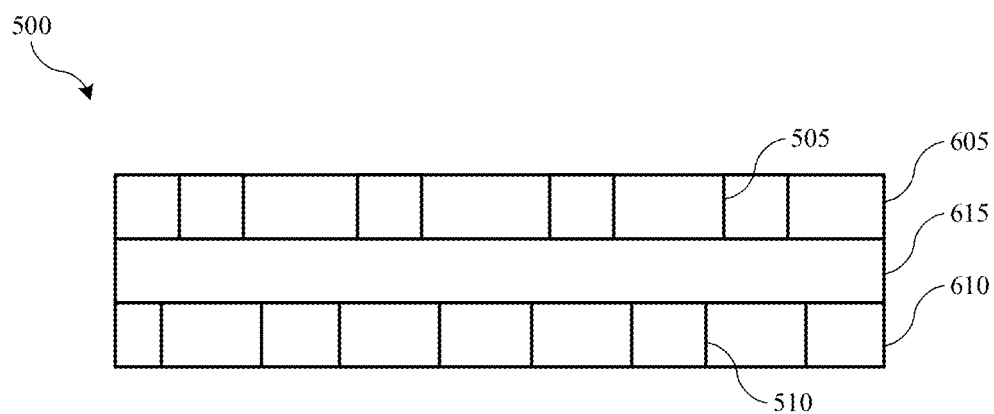
FIG. 6 shows a schematic cross-sectional view of an electrode stack according to some embodiments of the present technology.

FIG. 6 shows a schematic cross-sectional view of electrode stack 500 through line A-A according to some embodiments of the present technology. The stack illustrates an anode 605, a cathode 610, and a separator 615, which may include any of the characteristics of any component previously described. For example, anode 605 and cathode 610 may include multiple layers of electrode active material as discussed previously, as well as any of the materials or geometries described above. As illustrated, first apertures 505 through anode 605 may be characterized by a smaller diameter than second apertures 510 through cathode 610, which may produce an amount of overhang on some or all exposed edges of the electrodes or electrode active materials. Additionally, each first aperture 505 may be aligned with a second aperture 510 in some embodiments, although in some embodiments each first aperture 505 may be offset from a central axis through the aperture from any second aperture 510. As illustrated, each first aperture 505 through the anode electrode may be axially aligned or coaxial with a second aperture 510 through the cathode electrode, and anode active material may extend radially inward towards a central axis through the paired apertures. In some embodiments, this may fully expose separator 615 on one or both sides, which may provide additional access points for electrolyte diffusion through the battery cell.

Figure 7:
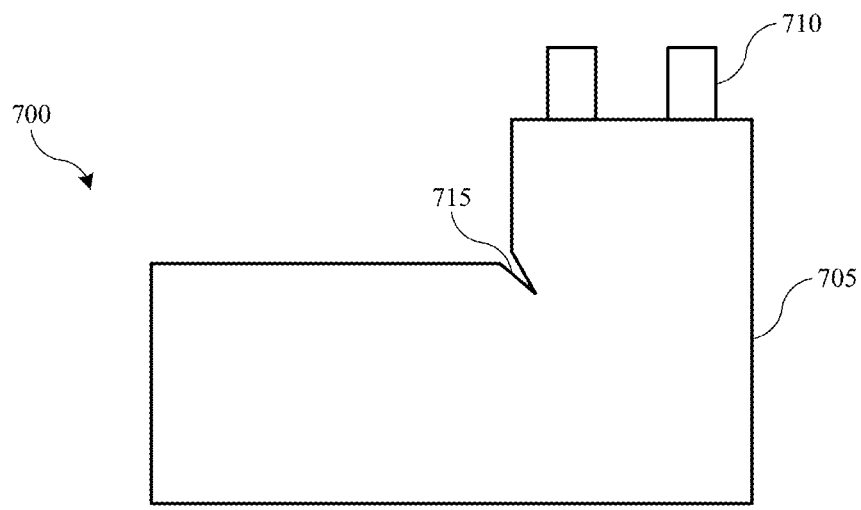
FIG. 7 shows a schematic plan view of a battery according to some embodiments of the present technology.

FIG. 7 shows a schematic plan view of a battery 700 according to some embodiments of the present technology. As illustrated, battery 700 may include a pouch enclosure 705 as previously discussed, and through which electrode tabs 710 may extend. Pouch 705 may extend about the electrode stack, and along each exterior surface, including at the interior corner described previously. The pouch may include a seal 715 extending about each side or a plurality of sides of the battery. The seal may be folded back against the pouch, glued, or otherwise coupled with the pouch about the outer surfaces of the electrode stack. As illustrated, by including a shaped interior corner as previously described, pouch 705 may be more readily sealed relative to a straight corner. Such a pouch may be sealed in a way that an exposed surface remains open for electrolyte fill, such as an edge through which the electrode tabs extend, although any edge may be used. By incorporating apertures through electrodes according to embodiments of the present technology, electrolyte diffusion and incorporation may be improved, limiting or preventing dry spots in the electrodes, and improving performance characteristics of the battery cell.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. An electrode stack comprising:
    an anode electrode including:
        an anode current collector; and
        an anode active material disposed on the anode current collector, wherein the anode electrode defines a plurality of first apertures through the anode electrode; and
    a cathode electrode including:
        a cathode current collector; and
        a cathode active material disposed on the cathode current collector, wherein the cathode electrode defines a plurality of second apertures through the cathode electrode, wherein;
    the anode electrode and the cathode electrode are each characterized by a longitudinal body section and a lateral body section extending from and normal to the longitudinal body section; and
    at least one of the first apertures and at least one of the second apertures are defined within the respective lateral body sections and the respective longitudinal body sections.

2. The electrode stack of claim 1, wherein each first aperture of the first apertures is axially aligned with a second aperture of the one or more second apertures.

3. The electrode stack of claim 1, wherein each first aperture of the first apertures is characterized by a first diameter, wherein each second aperture of the second apertures is characterized by a second diameter, and wherein the second diameter is greater than the first diameter.

4. The electrode stack of claim 1, further comprising a separator positioned between the anode electrode and the cathode electrode.

5. The electrode stack of claim 4, wherein the separator forms a physical barrier between each first aperture of the first apertures and each second aperture of the second apertures.

6. The electrode stack of claim 1, wherein intersections of each longitudinal body section and each lateral body section defines an interior corner.

7. The electrode stack of claim 6, wherein the anode electrode and the cathode electrode each define the interior corner as an arcuate shape recessed from a planar intersection of a sidewall of the lateral body section and a sidewall of the longitudinal body section.

8. The electrode stack of claim 1 wherein a subset of the plurality of first apertures are distributed parallel to a centerline through the longitudinal body section of the anode electrode, and wherein the subset of the plurality of first apertures are distributed parallel to a centerline through the lateral body section of the anode electrode.

9. The electrode stack of claim 1, wherein each first aperture of the first apertures extends radially inward of an associated second aperture of the second apertures towards a centerline through each associated pair of apertures.

10. The electrode stack of claim 1, wherein the anode active material is a first anode active material disposed on a first side of the anode current collector, and wherein the anode electrode further comprises a second anode active material disposed on a second side of the anode current collector.

11. The electrode stack of claim 10, wherein the first apertures extend fully through the first anode active material, the anode current collector, and the second anode active material.

12. The electrode stack of claim 10, wherein at least one aperture of the first apertures extends through the first anode active material and the anode current collector without extending into the second anode active material.

* * * * *